United States Patent
Schramm

(10) Patent No.: US 8,336,663 B2
(45) Date of Patent: Dec. 25, 2012

(54) ADAPTIVE SEATBELT APPARATUS

(76) Inventor: Michael R. Schramm, Perry, UT (US)

(*) Notice: Subject to any disclaimer, the term of this patent is extended or adjusted under 35 U.S.C. 154(b) by 553 days.

(21) Appl. No.: 12/623,602

(22) Filed: Nov. 23, 2009

(65) Prior Publication Data

US 2010/0162530 A1    Jul. 1, 2010

Related U.S. Application Data

(60) Provisional application No. 61/117,565, filed on Dec. 31, 2008, provisional application No. 61/141,763, filed on Dec. 31, 2008.

(51) Int. Cl.
*B60R 21/01* (2006.01)
*A44B 11/25* (2006.01)

(52) U.S. Cl. .............. 180/268; 24/166; 24/181

(58) Field of Classification Search .......... 280/805–807; 180/268; 297/474–477, 479; 24/579.09, 24/579.11, 166, 181
See application file for complete search history.

(56) References Cited

U.S. PATENT DOCUMENTS

| | | | | |
|---|---|---|---|---|
| 2,750,644 A * | 6/1956 | Martin et al. | | 24/598.1 |
| 3,890,003 A * | 6/1975 | Close | | 297/477 |
| 3,950,826 A * | 4/1976 | Knoll et al. | | 24/171 |
| 4,083,581 A | 4/1978 | Clifford | | 280/745 |
| 4,245,856 A | 1/1981 | Ziv | | 280/802 |
| 4,265,415 A | 5/1981 | Harrell et al. | | 242/107.4 |
| 4,296,942 A | 10/1981 | Clifford | | 280/803 |
| 4,374,594 A | 2/1983 | Kawaharazaki | | 280/801 |
| 4,398,750 A | 8/1983 | Thomas | | 280/802 |
| 4,773,613 A | 9/1988 | Kawai et al. | | 242/107.2 |
| 4,815,177 A | 3/1989 | MacKew | | 24/602 |
| 5,121,527 A * | 6/1992 | Righi | | 24/602 |
| 5,411,292 A * | 5/1995 | Collins et al. | | 280/806 |
| 5,482,314 A | 1/1996 | Corrado et al. | | 280/735 |
| 5,489,072 A * | 2/1996 | Gordon et al. | | 242/374 |
| 5,700,034 A * | 12/1997 | Lane, Jr. | | 280/805 |
| 6,123,166 A | 9/2000 | Verellen | | 180/268 |
| 6,272,411 B1 | 8/2001 | Corrado et al. | | 701/45 |
| 6,283,504 B1 | 9/2001 | Stanley et al. | | 280/735 |
| 6,343,841 B1 * | 2/2002 | Gregg et al. | | 297/468 |
| 6,497,431 B1 | 12/2002 | Schramm | | 280/736 |
| 6,520,392 B2 * | 2/2003 | Thibodeau et al. | | 224/275 |
| 6,577,023 B1 | 6/2003 | Stanley et al. | | 307/10.1 |
| 6,598,900 B2 | 7/2003 | Stanley et al. | | 280/735 |

(Continued)

FOREIGN PATENT DOCUMENTS

KR    10-1997-0015279    4/1997

(Continued)

OTHER PUBLICATIONS

Disclosed anonymously (Inventor=Michael R. Schramm), Improved Pedestrian Protection Hood Lifting Apparatus, Date=Aug. 2004, p. 1.

(Continued)

*Primary Examiner* — Drew Brown
(74) *Attorney, Agent, or Firm* — Michael R. Schramm

(57) ABSTRACT

The present invention is an adaptive seatbelt apparatus having the means in response to a first situation to readily allow release or disengagement of the seatbelt apparatus when the seatbelt apparatus is loaded with a predetermined belt tension load, and having the means in response to a second situation to prevent release or disengagement of the seatbelt apparatus notwithstanding the seatbelt apparatus being loaded with the predetermined belt tension load.

30 Claims, 8 Drawing Sheets

U.S. PATENT DOCUMENTS

| | | | | |
|---|---|---|---|---|
| 6,817,629 B2 * | 11/2004 | Herberg et al. | | 280/801.1 |
| 6,829,952 B2 * | 12/2004 | Stanley et al. | | 73/862.391 |
| 6,851,160 B2 * | 2/2005 | Carver | | 24/197 |
| 6,898,829 B2 * | 5/2005 | Loe et al. | | 24/599.5 |
| 7,140,571 B2 * | 11/2006 | Hishon et al. | | 242/390.8 |
| 7,178,208 B2 | 2/2007 | Bentsen et al. | | 24/303 |
| 7,180,258 B2 * | 2/2007 | Specht et al. | | 318/432 |
| 7,201,248 B1 | 4/2007 | Shaw | | 180/268 |
| 7,240,924 B2 * | 7/2007 | Kohlndorfer et al. | | 280/807 |
| 7,413,049 B2 | 8/2008 | Schramm et al. | | 180/274 |
| 7,571,934 B2 * | 8/2009 | Bell et al. | | 280/801.1 |
| 7,753,410 B2 * | 7/2010 | Coultrup | | 280/808 |
| 7,866,703 B2 * | 1/2011 | Spahn et al. | | 280/806 |
| 8,201,850 B2 * | 6/2012 | Browne et al. | | 280/801.1 |
| 2003/0149530 A1 | 8/2003 | Stopczynski | | 701/301 |
| 2003/0150088 A1 * | 8/2003 | Turpin | | 24/579.09 |
| 2007/0000104 A1 * | 1/2007 | Zelmer | | 24/633 |
| 2007/0006431 A1 | 1/2007 | Bentsen et al. | | 24/636 |
| 2007/0204442 A1 | 9/2007 | Falb et al. | | 24/633 |
| 2008/0054615 A1 | 3/2008 | Coultrup | | 280/801.1 |
| 2008/0222900 A1 | 9/2008 | Lee | | 30/298.4 |
| 2009/0139069 A1 | 6/2009 | Thomas | | 24/603 |

FOREIGN PATENT DOCUMENTS

| | | |
|---|---|---|
| KR | 20-1997-0035496 | 7/1997 |
| WO | WO97/28996 | 8/1997 |

OTHER PUBLICATIONS

U.S. Appl. No. 12/134,021, filed Jun. 5, 2008, Schramm.

U.S. Appl. No. 12/274,164, filed Nov. 19, 2008, Schramm et al.

* cited by examiner

ADAPTIVE SEATBELT APPARATUS

CROSS REFERENCE TO RELATED APPLICATION

This application claims the benefit under 35 U.S.C. §119 (e) of U.S. Provisional Patent Application No. 61/117,565, filed Nov. 24, 2008, and of U.S. Provisional Patent Application No. 61/141,763, filed Dec. 31, 2008, all of which are incorporated herein in their entirety by this reference.

FIELD OF THE INVENTION

The present invention relates to seatbelts, and more especially to seatbelts having a low load release mode for emergency release of the seatbelt.

BACKGROUND OF THE INVENTION

Seatbelts are well known in the vehicular safety industry and have had broad usage for many years in saving lives and reducing injury that might have otherwise occurred to accident victims. However, in spite of the many advantages seatbelts provide, and in spite of laws passed by many states within the United States, there remains a significant portion of the motoring public that choose not to use seatbelts. Reasons for such intentional non-use of seatbelts include for instance concerns regarding extrication (especially self-extrication) from a post-accident vehicle, especially when such post-accident vehicle comes to rest in a body of water such as a river or a lake and a vehicle occupant is unable to reach or otherwise release a seatbelt. Recently, an incident where a seatbelt became entangled around a child's neck was known to have occurred (see "Child Revived After Being Strangled by Seat Belt" article included herein as appendix C). In the incident, the seatbelt was reported to have become tight enough that the panicking mother was unable to depress the eject button sufficient to release the seatbelt. In the incident, the responding police officer had to sever the seatbelt to extricate the child. Certain police departments, including the one identified in the incident have required the carrying of a knife for use in cutting a seatbelt to release an occupant in an emergency situation. Further, at least three other similar incidents are reported to have occurred in the last decade (see "Boy, 5, Riding With Family on I-95 Is Critically Injured by Seat Belt" article included herein as appendix D). Although release of a properly functioning seatbelt typically requires relatively little time, an additional reason for intentional non-use of seatbelts includes the concern, particularly for law enforcement officers, of not being able to exit a vehicle quickly enough in emergency situations such as when needing to exit a vehicle and draw a weapon in a threatening or potentially threatening situation when time is of the essence and the time required to release a seatbelt may result in increased danger or harm to the officer (see the Nov. 23, 2008 Standard Examiner articles regarding law enforcement concerns regarding seatbelts, included herein as appendices A and B). Thus many law enforcement officers are not taking advantage of the benefits of seatbelts due to the disadvantages of the current seatbelt state of the art. Some efforts to solve the above described problems have been attempted. Such efforts include the concepts disclosed in the following US patents and applications which are incorporated herein by reference in their entirety: U.S. Pat. No. 4,083,581 to Clifford entitled "Emergency Release Systems", U.S. Pat. No. 4,245,856 to Ziv entitled "Emergency Release for Passive Seat Belt Systems", U.S. Pat. No. 4,265,415 to Harrell et al entitled "Emergency Release Device for Seat Belt Retractor", U.S. Pat. No. 4,296,942 to Clifford entitled "Emergency Release Systems", U.S. Pat. No. 4,374,594 to Kawaharazaki entitled "Emergency Buckle Device", U.S. Pat. No. 4,398,750 to Thomas entitled "Emergency Release Mechanism for Passive Seat Belt Systems", U.S. Pat. No. 4,773,613 to Kawai et al entitled "Emergency Lock Retractor Equipped with Webbing clamp Device", U.S. Pat. No. 4,815,177 to MacKew entitled "Automatic Time-Delayed Release Buckle", U.S. Pat. No. 5,121,527 to Righi entitled "Automatic Release Device for Seat Belts on Motor-Vehicles or the Like", U.S. Pat. No. 6,123,166 to Verellen entitled "Release Apparatus for a Seat Belt Buckle", U.S. Pat. No. 7,178,208 to Bentsen et al entitled "Seat Belt with Magnetically Seated Buckle and Automatic Release", U.S. Pat. No. 7,201,248 to Shaw entitled "User-Controlled Vehicle Safety Belt Release System", 2007/0006431 to Bentsen et al entitled "Seat Belt with Magnetically Seated Buckle and Automatic Release", 2007/0204442 to Falb et al entitled "Seat Belt Buckle", 2008/0054615 to Coultrup entitled "Tactical Seatbelt Quick Release System", and 2009/0139069 to Thomas entitled "Automatic Seat Belt Release System".

SUMMARY OF THE INVENTION

The invention disclosed herein is an adaptive seatbelt apparatus having the means to readily allow release or disengagement of the seatbelt apparatus at a predetermined load in response to a first situation, and having the means to prevent release or disengagement of the seatbelt apparatus at the predetermined load in response to a second situation. In contrast to an apparatus that completely releases a seatbelt in response to an intentional release actuation or in response to an emergency situation, the adaptive seatbelt apparatus has an advantage not releasing the seatbelt, but rather rending the seatbelt easily releasable or extractable, and thus avoids the nuisance of the requirement to re-buckle the seatbelt in a false-positive emergency or non-emergency situations (i.e. a situation when seatbelt release is not desirable). Further, there is no damage to the adaptive seatbelt apparatus is the adaptive seatbelt apparatus is released, or in other words, the adaptive seatbelt release apparatus is completely reusable.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

Figure 1:
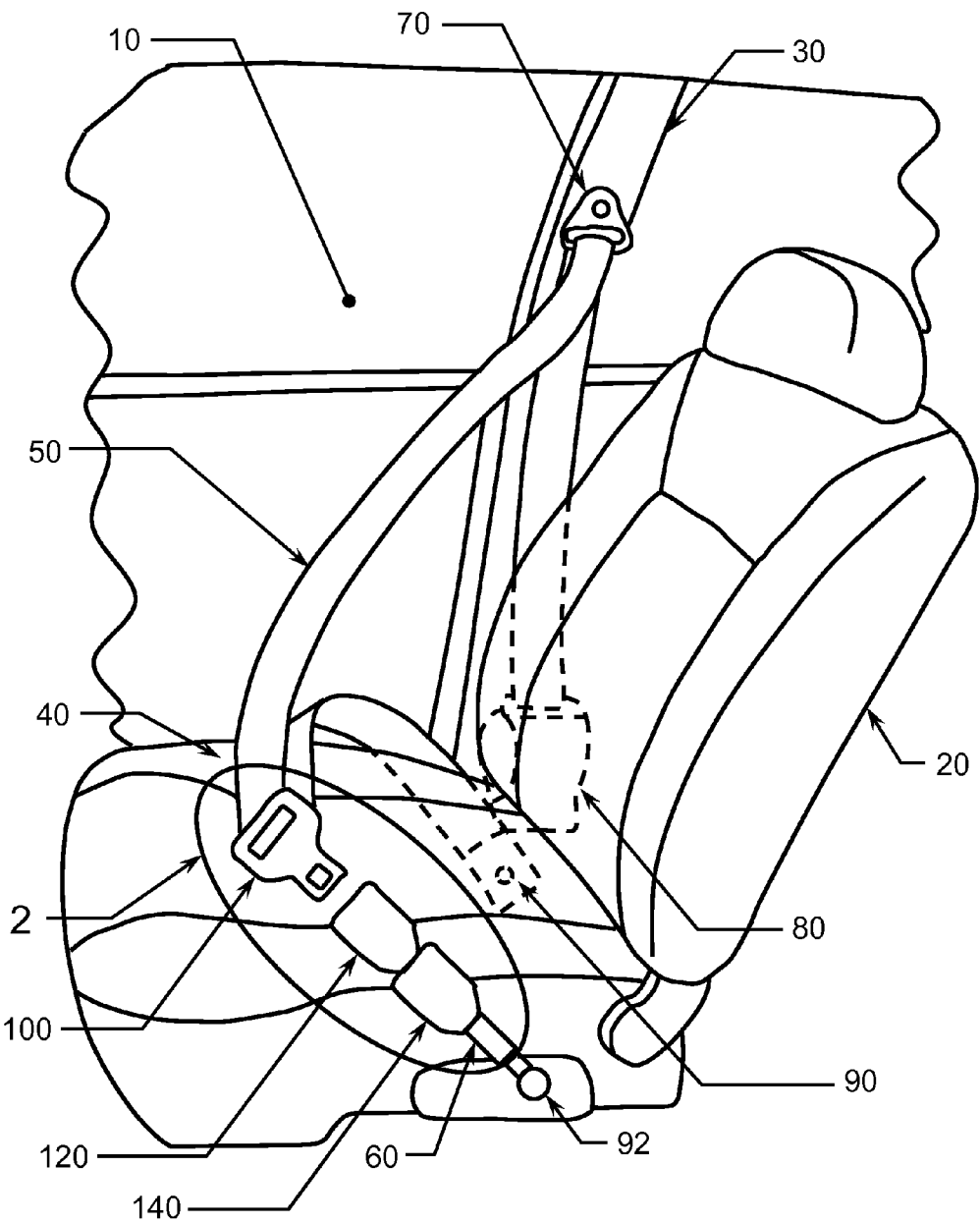
FIG. 1 is a trimetric view of a first embodiment of the adaptive seatbelt apparatus and includes the display of a portion of the interior of a vehicle in which the apparatus is shown installed.
Figure 2:
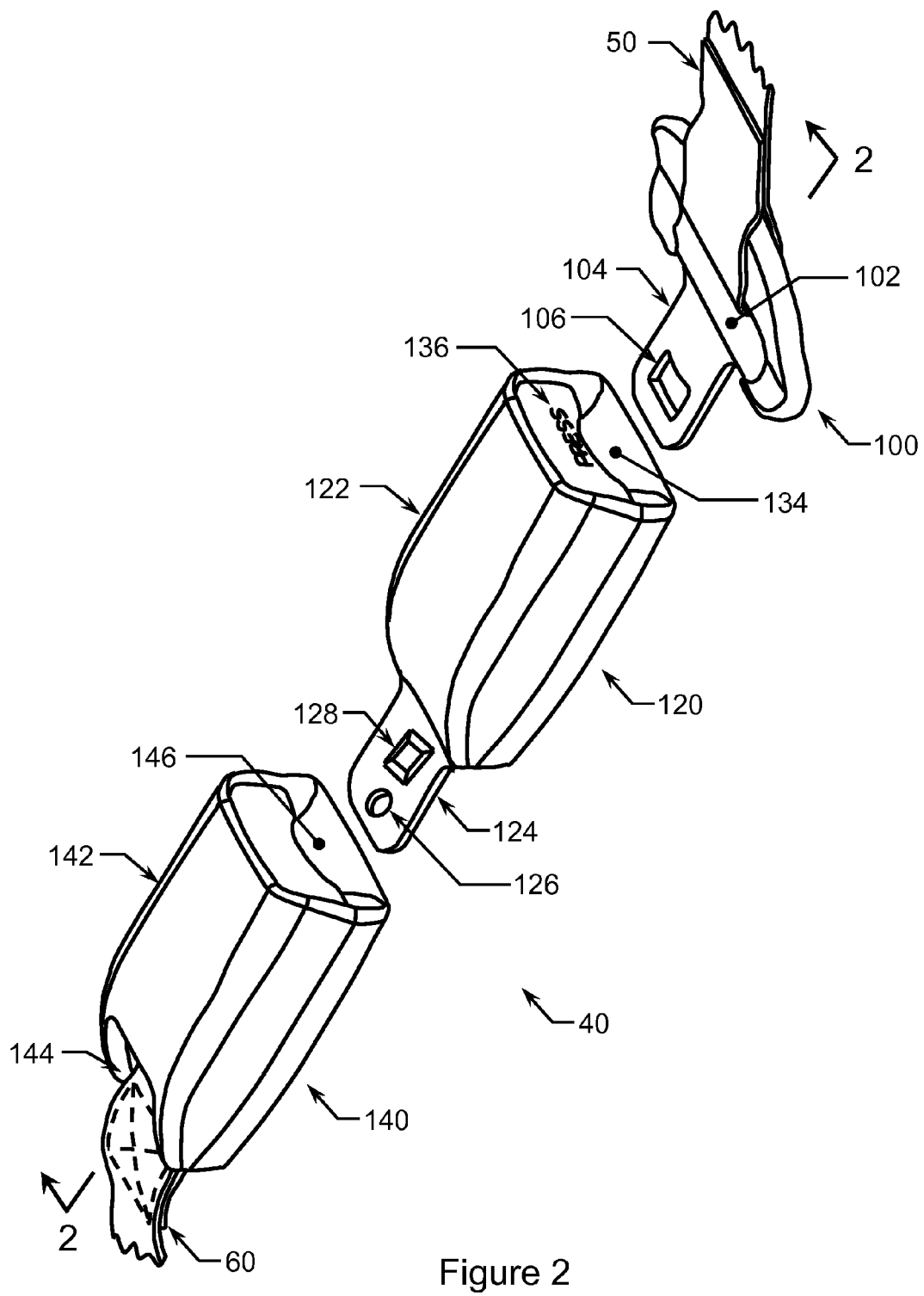
FIG. 2 is an enlarged alternate trimetric view of the buckle portions of the adaptive seatbelt apparatus shown in FIG. 1.
Figure 5:
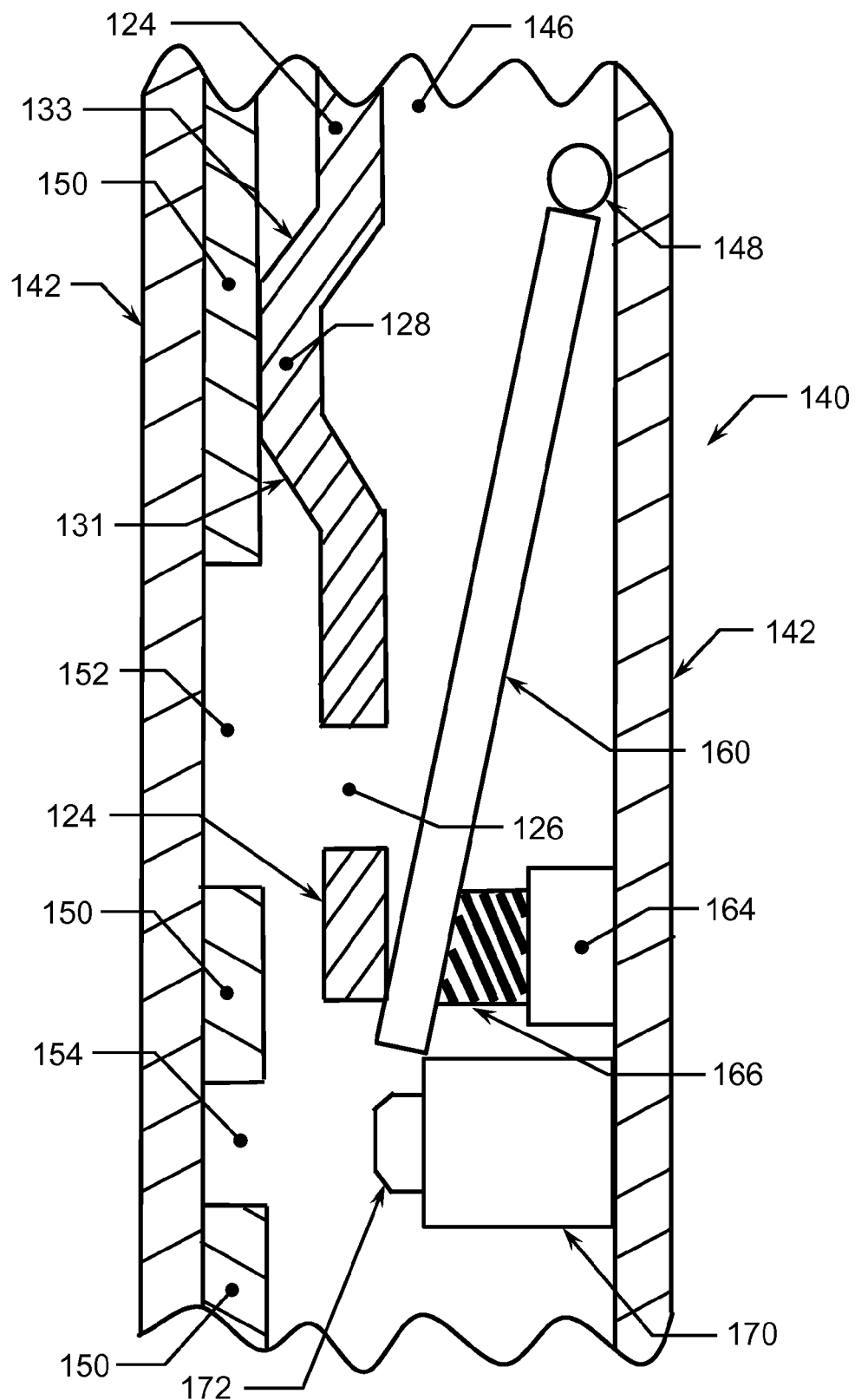
Figure 6:
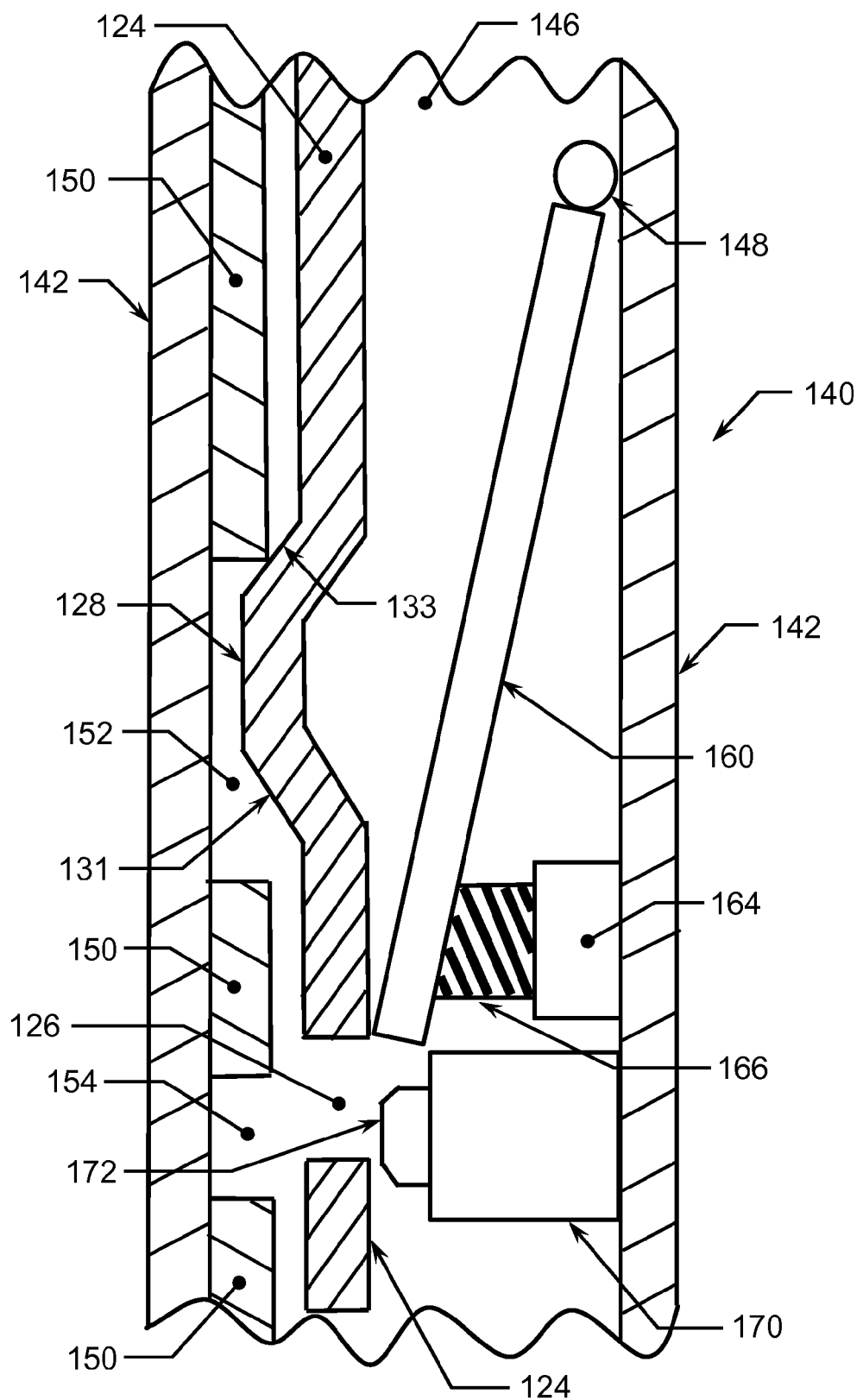
Figure 7:
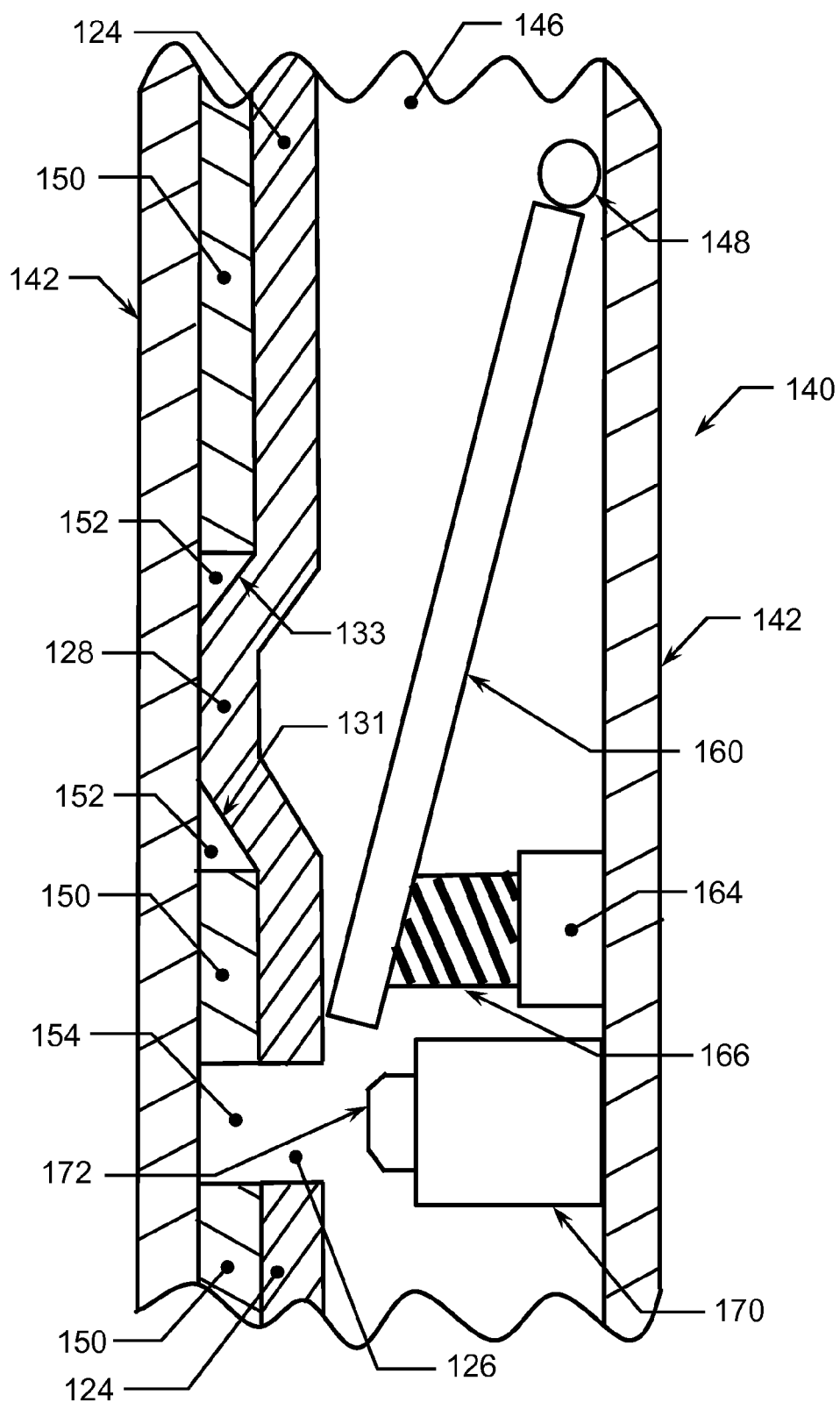
Figure 8:
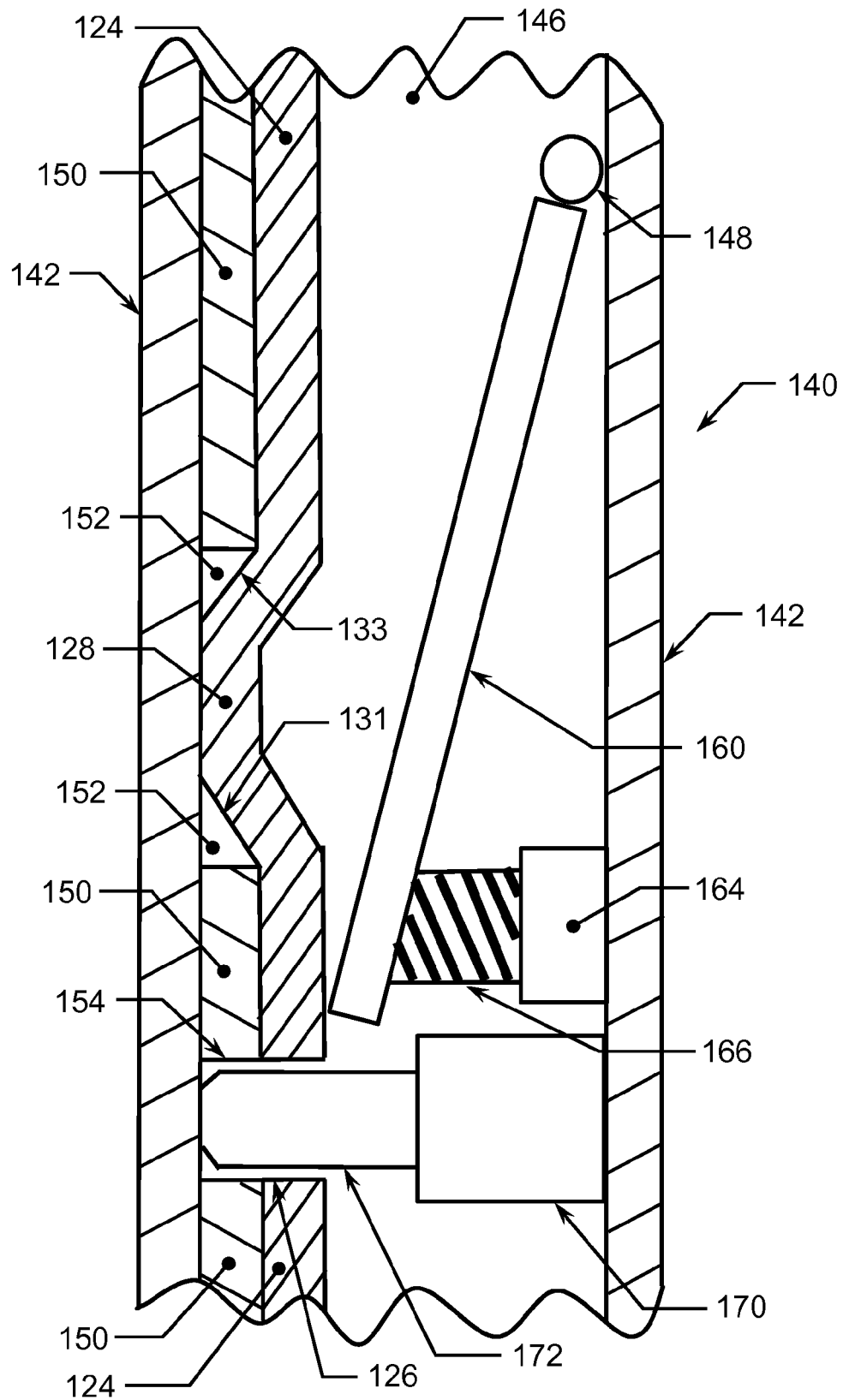

2 with the adaptive seatbelt apparatus shown in a first stage buckle entry position (which is substantially equivalent to a third stage buckle exit position);

FIG. 5 is an orthographic cross-sectional view of the second buckle assembly of the adaptive seatbelt apparatus taken at the location indicated by the section arrows shown in FIG. 2 with the adaptive seatbelt apparatus shown in a second stage buckle entry position (which is substantially equivalent to a second stage buckle exit position);

FIG. 6 is an orthographic cross-sectional view of the second buckle assembly of the adaptive seatbelt apparatus taken at the location indicated by the section arrows shown in FIG. 2 with the adaptive seatbelt apparatus shown in a third stage buckle entry position (which is substantially equivalent to a first stage buckle exit position);

FIG. 7 is an orthographic cross-sectional view of the second buckle assembly of the adaptive seatbelt apparatus taken at the location indicated by the section arrows shown in FIG. 2 with the adaptive seatbelt apparatus shown in a buckle engaged and lock pin disengaged position, and;

FIG. 8 is an orthographic cross-sectional view of the second buckle assembly of the adaptive seatbelt apparatus taken at the location indicated by the section arrows shown in FIG. 2 with the adaptive seatbelt apparatus shown in a buckle engaged and lock pin engaged position.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring now to the drawings, the invention is an adaptive seatbelt apparatus having the means to readily allow release or disengagement of the seatbelt apparatus at a predetermined load limit in response to a first situation, and having the means to prevent release or disengagement of the seatbelt apparatus at the predetermined load limit and preferably at a second higher load limit in response to a second situation. The first situation may be for instance a subject vehicle non-movement situation or a subject vehicle moving at a rate of less than a predetermined rate such as less than 5 miles per hour situation. Optionally, still subject vehicle predetermined rates such as a 30 mile per hour rate or any rate from 30 miles per hour to 0 miles per hour inclusive are contemplated. The first situation may further optionally be the detection of a pending crash-free situation (of the subject vehicle) or detecting an absence of an oncoming vehicle having a closure rate of more than a predetermined closure rate such as a closure rate of more than 5 miles per hour situation. The first situation may yet further optionally be a combination of a detecting the subject vehicle moving at a rate of less than a predetermined rate and the detection of the absence of an oncoming vehicle having a closure rate of more than a predetermined closure rate.

The second situation may be for instance the subject vehicle moving at a rate of more than a predetermined rate such as more than 5 miles per hour situation. Optionally, still other vehicle predetermined rates such as 1, 2, 3, 8, 10, 13, 15, 18, 20, 22, 15, 30, or any other speed greater than 3 miles per hour rate are contemplated. The second situation may further optionally be the detection of an impending crash situation or detecting an oncoming vehicle having a closure rate of more than a predetermined closure rate such as a closure rate of more than 5 miles per hour situation. The second situation may yet further optionally be either the detection of the subject vehicle moving at a rate of more than a predetermined rate or the detection of an oncoming vehicle having a closure rate of more than a predetermined closure rate.

The first lower load limit may be for instance a 5 pound load limit or other such load limit as would allow a "belted" (having the seatbelt apparatus buckled around a vehicle occupant providing a restraining means for the occupant) vehicle occupant to cause the seatbelt to release simply push out of the seatbelt and yet as would prevent inadvertent seatbelt releases. Further, such first lower load limit may be for instance any wherein from a 1 to a 50 pound load. Or stated differently, by moving from a seated and belted position to an unseated position such as an "exited a vehicle" position, the occupant may cause the seatbelt to release hands-free and with very little effort. The second higher load limit may be for instance a one thousand pound load limit or other such load limit as would allow the adaptive seatbelt apparatus in a second situation to function in the conventional fashion such as providing a load resisting limitation that may cause failure of an anchor point or of a seat or vehicle frame before the release of the seatbelt. Other possible second higher load limits may include for instance a 5, 10 20, 50, 100, 250, 500 or other load limit.

In order to facilitate the understanding of the present invention in reviewing the drawings accompanying the specification, a feature list is provided below. It is noted that like features are like numbered throughout all of the figures.

FEATURE TABLE

| # | Feature | # | Feature |
|---|---|---|---|
| 10 | Vehicle interior | 20 | Vehicle seat |
| 30 | Vehicle support column | 40 | Adaptive seatbelt apparatus |
| 50 | First belt portion | 60 | Second belt portion |
| 70 | Pulley | 80 | Retractor |
| 90 | First anchor | 92 | Second anchor |
| 100 | First clip | 102 | Belt mounting hole |
| 104 | Tang | 106 | Engagement hole |
| 120 | First buckle assembly | 122 | Housing |
| 124 | Tang | 126 | Lock pin reception hole |
| 128 | Knob | 131 | Knob first ramp |
| 133 | Knob second ramp | 135 | Mouth |
| 136 | Eject button | 140 | Second buckle assembly |
| 142 | Housing | 144 | Belt mount |
| 146 | Mouth | 148 | Hinge |
| 150 | First grip plate | 152 | Knob engagement hole |
| 154 | Lock pin reception hole | 160 | Second grip plate |
| 164 | Actuator | 166 | Spring |
| 170 | Solenoid | 172 | Lock pin |

The adaptive seatbelt apparatus comprises a conventional seatbelt apparatus such as a three-point seatbelt apparatus except that a secondary (female) buckle having a secondary (male) clip is positioned between the primary or convention seatbelt buckle and the anchor point of the seatbelt apparatus (for instance where the seatbelt is fastened to the vehicle floor), and forms a load resisting portion of the seatbelt apparatus such that when the secondary buckle is released (i.e. releases the secondary clip), the seatbelt apparatus is released and such that when the secondary buckle is engaged or buckled (i.e. the secondary clip is engaged in the secondary buckle), the seatbelt apparatus is engaged. The secondary buckle is further adapted such that when the secondary buckle is buckled, the secondary clip may be pulled out of the secondary buckle by applying a first predetermined load such as a load of five pounds or more. This may be accomplished by a variety of different methods. In one embodiment, the secondary clip is sandwiched or frictionally held between two spring loaded grip plates. The force required to withdraw the secondary clip from the grip plates is proportionate to the spring load that is applied to the grip plates, with a lower spring load corresponding to a lower force threshold required to withdraw the clip from the grip plates and a higher spring load corresponding to a higher force threshold required to withdraw the clip from the grip plates. It is contemplated that the adaptive seatbelt apparatus may be provided such that the clip release load limits may be pre-established by a manufacturer, may be user adjustable, or may be automatically adaptive by for instance varying a pre-load on the springs of the grip plates based on for instance the occupant weight (e.g. higher spring pre-load for a heavier occupant and lower spring pre-load for a lighter occupant) or other various inputs. The secondary buckle is further adapted to include an electronically actuated solenoid having a locking pin, and the secondary clip is adapted to include a locking pin receiving hole. The secondary buckle is further adapted such that when the solenoid is energized, the locking pin is moved into the locking pin receiving hole and causes the secondary buckle to be held or engaged such that a load of equal to or greater that a second predetermined load, such as a load of one thousand pounds or more, is required to be applied to the adaptive seatbelt apparatus in order to cause the secondary clip to be released.

More specifically, in a first embodiment of the invention, adaptive seatbelt apparatus 40 comprises a seatbelt apparatus having a first belt portion 50, a second belt portion 60, a pulley 70, a retractor 80, a first anchor 90, a second anchor 92, a first clip 100, a first buckle assembly 120, and a second buckle assembly 140. Pulley 70 is mounted to a vehicle support column 30, retractor 80 is mounted to a vehicle interior 10, and anchors 90 and 92 are mounted to a vehicle seat 20.

First clip 100 defines a seatbelt clip having a belt mounting hole 102, a tang 104, and an engagement hole 106.

First buckle assembly 120 defines a seatbelt buckle having a housing 122, a tang 124, a mouth 135, and an eject button 136. Tang 124 further includes a lock pin reception hole 126, a knob 128, a first knob ramp 131, and a second knob ramp 133. Mouth 134 is formed in a first end of housing 122, and eject button 136 is actuatingly connected to housing 122 and positioned proximate to mouth 134. Tang 124 is mounted to a second end of housing 122.

Second buckle assembly 140 defines a seatbelt buckle having a housing 142, a belt mount 144, a mouth 146, a hinge 148, a first grip plate 150, a second grip plate 160, an actuator 164, a spring 166, a solenoid 170, and a lock pin 172. First grip plate 150 further includes a knob engagement hole 152 and a lock pin reception hole 154. Mouth 146 is formed in a first end of housing 142, and belt mount 144 is connected to a second end of housing 142. First grip plate 150 is connected to a first inner wall of housing 142, and hinge 148, actuator 164, and solenoid 170 are all connected to a second inner wall of housing 142. Spring 166 is connected to actuator 164, and lock pin 172 is extendably and retractably connected to solenoid 170. Second grip plate 160 is connected to hinge 148 on a first end and is positioned next to spring 166 on a second end.

Adaptive seatbelt apparatus 40 is assembled such that a first end of first belt portion 50 is connected to retractor 80, a second end of first belt portion 50 is connected to first anchor 90, and first belt portion 50 is threaded through belt mounting hole 102 of clip 100. First clip 100 is engaged to first buckle assembly 120 by inserting tang 104 of first clip 100 into mouth 134 of first buckle assembly 120. First clip 100 is further disengagable from first buckle assembly 120 by depressing eject button 136. First buckle assembly 120 is engaged to second buckle assembly 140 by inserting tang 124 of first buckle assembly 120 into mouth 146 of second buckle assembly 140. Depending on the (sensed) situation, first buckle assembly 120 is further disengagable from second buckle assembly 140 by merely pulling on or otherwise placing an extraction or disengagement load on first buckle assembly 120 sufficient for first buckle assembly 120 to become disengaged from second buckle assembly 140. Second buckle assembly 140 is connect to second belt portion 160 by a first end of second belt portion 160 being connected to belt mount 144. A second end of second belt portion 160 is connected to second anchor 92. It shall be noted for the purposes of this application that included in the definition of a "disengagement load" shall be a load—typically applied in tension—that is placed on a seatbelt apparatus such that the seatbelt apparatus becomes disengaged in direct response to the loading in a non-destructive and typically re-engageable manner if the seatbelt apparatus is in a disengageable mode and if the disengagement load is of a sufficient magnitude to cause disengagement. It shall be further noted for the purposes of this application that a "disengagement load" defines over and is distinguished from a load placed on an eject button or the like to cause a seatbelt apparatus to disengage.

Figure 3:
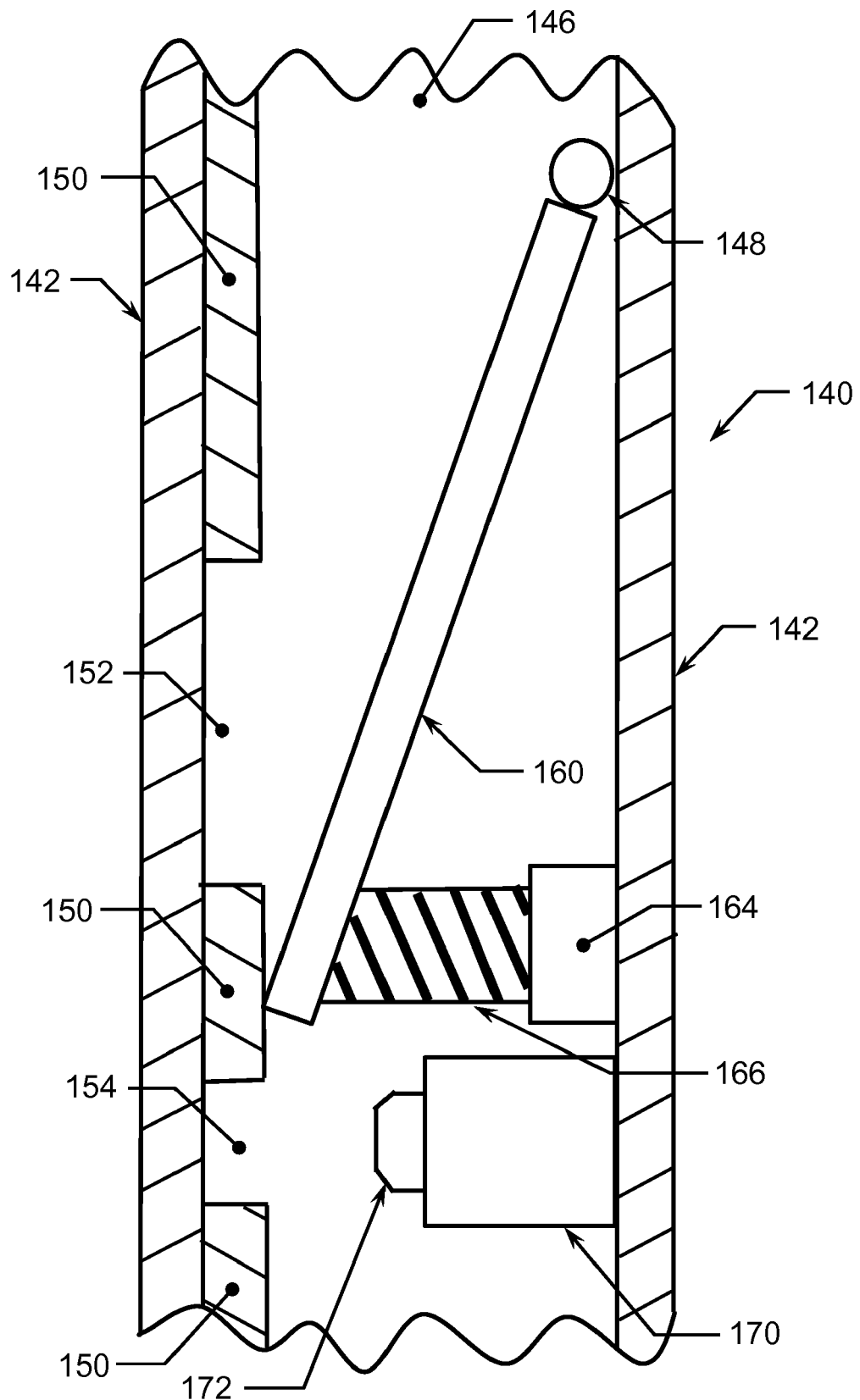
FIG. 3 is an orthographic cross-sectional view of the second buckle assembly of the adaptive seatbelt apparatus with the adaptive seatbelt apparatus shown in an unbuckled position.
Figure 4:
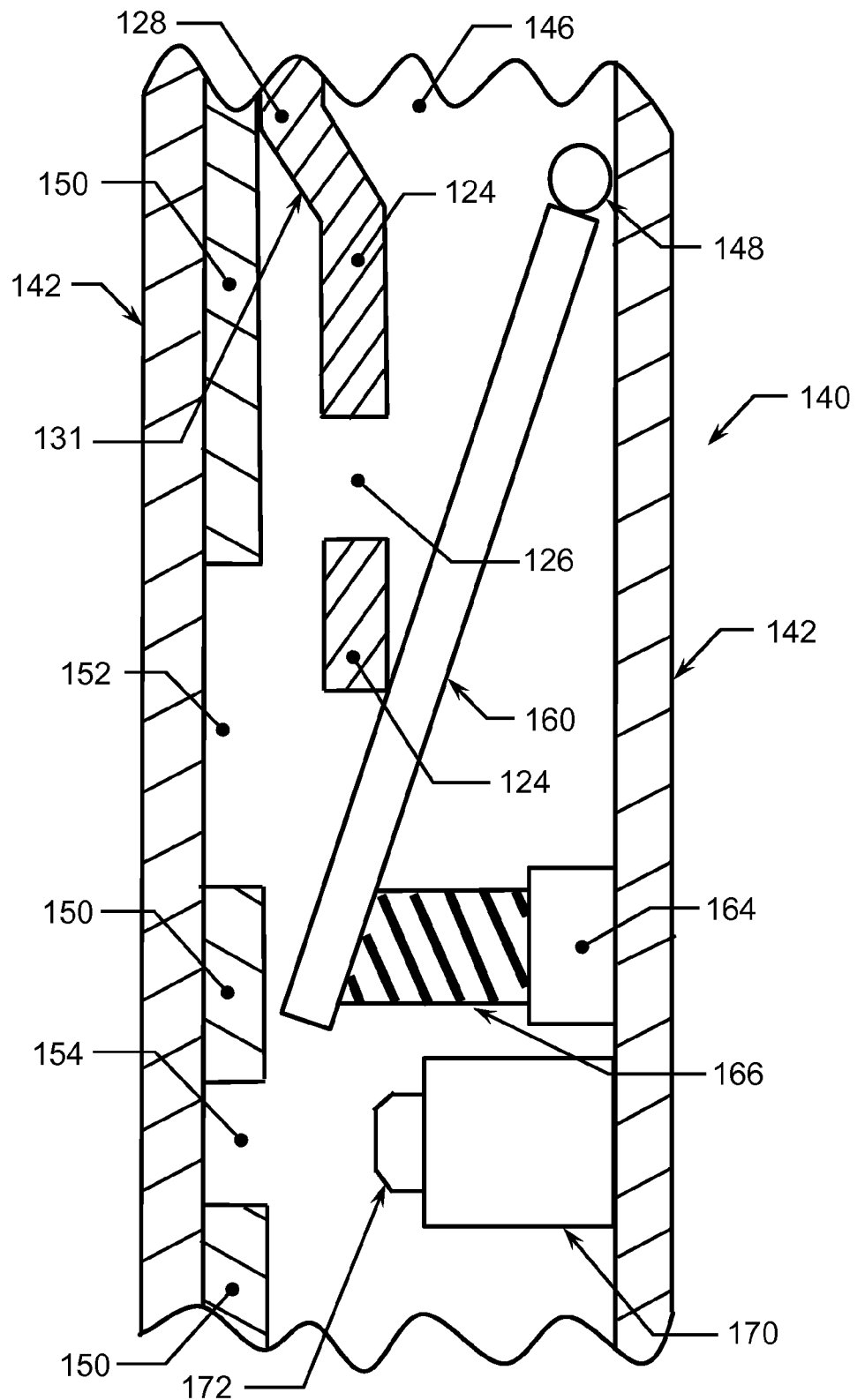
FIG. 4 is an orthographic cross-sectional view of the second buckle assembly of the adaptive seatbelt apparatus taken at the location indicated by the section arrows shown in FIG.

To further illustrate the function of adaptive seatbelt apparatus 40, reference is made to FIGS. 3 through 8. FIG. 3 depicts a cross-sectional view of second buckle assembly 140 without tang 124 of first buckle assembly 120 being inserted into buckle assembly 140 (e.g. pre-insertion or post-extraction of tang 124). Second grip plate 160 is shown spring loadedly positioned against first grip plate 150 by means of spring 166 pushing against second grip plate 160 and lock pin 172 is shown in a retracted (unlocked) position. Actuator 164 functions to apply a greater or lesser compressive load on spring 164, with such compressive load preferably corresponding to a sensed condition. Thus for instance, if a larger or heavier occupant is sensed, a greater compressive load is applied to spring 166 resulting in a greater force required to cause second grip plate 160 to be moved away from first grip plate 150. Conversely for instance, if a smaller or lighter occupant is sensed, a lesser compressive load is applied to spring 166 resulting in a lesser force required to cause second grip plate 160 to be moved away from first grip plate 150. FIG. 4 depicts a cross-sectional view of second buckle assembly 140 with tang 124 of first buckle assembly 120 being in a first stage of insertion into buckle assembly 140 (pictorially substantially equivalent to a third stage of extraction of tang 124 from buckle assembly 140). Second grip plate 160 is shown slightly "opened" from first grip plate 150 by tang 124, spring 166 is shown somewhat more compressed than in FIG. 3, and lock pin 172 is shown in a retracted (unlocked) position. FIG. 5 depicts a cross-sectional view of second buckle assembly 140 with tang 124 of first buckle assembly 120 being in a second stage of insertion into buckle assembly 140

(pictorially substantially equivalent to a second stage of extraction of tang 124 from buckle assembly 140). Second grip plate 160 is shown "opened" further from first grip plate 150 by tang 124 than it was in FIG. 4, spring 166 is shown further compressed than in FIG. 4, and lock pin 172 is shown in a retracted (unlocked) position. FIG. 6 depicts a cross-sectional view of second buckle assembly 140 with tang 124 of first buckle assembly 120 being in a third stage of insertion into buckle assembly 140 (pictorially substantially equivalent to a first stage of extraction of tang 124 from buckle assembly 140). Second grip plate 160 is shown "opened" an intermediate amount from first grip plate 150 by tang 124, spring 166 is shown compressed an intermediate amount, knob 128 is shown beginning to be positioned into knob engagement hole 152 by knob second ramp 133 sliding against the corner of engagement hole 152 (pictorially substantially equivalent to knob 128 is beginning to be extracted from knob engagement hole 152 by knob second ramp 133 sliding against the corner of engagement hole 152), and lock pin 172 is shown in a retracted (unlocked) position. FIG. 7 depicts a cross-sectional view of second buckle assembly 140 with tang 124 of first buckle assembly 120 fully inserted into second buckle assembly 140 by knob 128 being seated into engagement hole 152. Second grip plate 160 is shown securingly pressed against tang 124, spring 166 is shown compressed an intermediate amount, and lock pin 172 is shown in a retracted position. With adaptive seatbelt apparatus 40 thus assembled, but with lock pin 172 in a retracted (unlocked) position, the application of a predetermined extraction load to first buckle assembly 120 will cause knob second ramp 133 to "ride up" the edge of knob engagement hole 152, knob 128 to become dislodged from knob engagement hole 152, second grip plate 160 to move away from first grip plate 150, spring 166 to be further compressed, and first buckle assembly 120 to be extracted from second buckle assembly 140. FIG. 8 depicts a cross-sectional view of second buckle assembly 140 with tang 124 of first buckle assembly 120 fully inserted into second buckle assembly 140 by knob 128 being seated into engagement hole 152. Second grip plate 160 is shown securingly pressed against tang 124, spring 166 is shown compressed an intermediate amount, and lock pin 172 is shown in an extended (locked) position. Lock pin 172 is extended preferably corresponding to a sensed condition such as a vehicle moving faster than a predetermined amount condition or an impending crash condition. With lock pin 172 extended, lock pin 172 is engaged into lock pin reception hole 126 of tang 124 and lock pin reception hole 154 of first grip plate 150. With lock pin 172 thus extended, first buckle assembly 120 is prevented from being extracted from second buckle assembly 140.

The invention contemplates that a vehicle in which the adaptive seatbelt apparatus is installed will include sensors and a CPU such as are common in the art such that in combination the vehicle will have the means to detection vehicle speed, oncoming vehicle speed, occupant presence, occupant weight, etc., and communicate such information as needed to appropriately actuate adaptive seatbelt apparatus 40 in the manner described above. Exemplary inventions relating to occupant sensing, collision sensing, and automotive safety systems included the concepts disclosed in the following US patents and applications and research disclosure which are incorporated herein by reference in their entirety: U.S. Pat. No. 5,482,314 to Corrado et al entitled "Automotive Occupant Sensor System and Method of Operation by Sensor Fusion", U.S. Pat. No. 6,272,411 to Corrado et al entitled "Method of Operating a Vehicle Occupancy State Sensor System", U.S. Pat. No. 6,283,504 to Stanley et al entitled "Occupant Sensor", U.S. Pat. No. 6,497,431 to Schramm entitled "Adaptive Restraint System", U.S. Pat. No. 6,577,023 to Stanley et al entitled "Occupant Detection System", U.S. Pat. No. 6,598,900 to Stanley et al entitled "Occupant Detection System", U.S. Pat. No. 7,413,049 to Schramm et al entitled "Pedestrian Protection Hood Lifting Systems", 2003/0149530 to Stopczynski entitled "Release Collision Warning and Safety Countermeasure System", and research disclosure U.S. Pat. No. 484,045 to Schramm entitled "Improved Pedestrian Protection Hood Lifting Apparatus". It is further contemplated that adaptive seatbelt apparatus 40 may be provided with and used in combination with seatbelt load limiting and seatbelt "pretensioning". It is also noted that in an alternate embodiment, the functions of the secondary buckle may be integrated into a single modified primary buckle. It is also noted that in yet a further alternate embodiment, a buckle having the described functions of the secondary buckle may be located at a different location on the adaptive seatbelt apparatus such as near an anchor mount point end of the adaptive seatbelt apparatus. It is also noted that in yet a further alternate embodiment, adaptive seatbelt apparatus 40 may be retroactively installed in a vehicle. It is further noted that actuator 164 or solenoid 170 or both may optionally be replaced with an active material and more preferably by a two-way "active material" such as a shape memory alloy (SMA). Exemplary inventions relating to "active materials" included the concepts disclosed in us patent application Ser. No. 12/134,021 to Schramm entitled "Systems and Methods for Airbag Tether Release", and Ser. No. 12/274,164 to Schramm et al entitled "Active Material Actuated Vent Valve". U.S. patent application Ser. Nos. 12/134,021 and 12/274,164, and the applications and the patents which are cited therein are all incorporated herein by reference in their entirety. It is further contemplated that adaptive seatbelt apparatus 40 may be used in combination with a warning or indication such as an indicia or sound. It is noted that there exists a substantially universally recognized seatbelt indication symbol typically comprising a constant red (LED) lighted image of a person seated in a vehicle seat and having a seatbelt restraining the person (hereinafter seatbelt symbol). In a vehicle incorporating adaptive seatbelt apparatus 40, the vehicle could for instance display: a flashing red seatbelt symbol when adaptive seatbelt apparatus 40 is unbuckled, a steady yellow/amber seatbelt symbol when adaptive seatbelt apparatus 40 is buckled but releasable in response to a predetermined load (e.g. adaptive seatbelt apparatus 40 in the unlocked position), and a steady temporary green seatbelt symbol when adaptive seatbelt apparatus 40 is buckled and not releasable in response to the predetermined load (e.g. adaptive seatbelt apparatus 40 in the locked position). Other combinations of colors, steady versus blinking, and temporary versus non-temporary seatbelt symbols are also contemplated.

Having described adaptive seatbelt apparatus 40, it is pointed out that in practice, usage of adaptive seatbelt apparatus 40 is very similar to the use of a conventional seatbelt. Thus for instance, if a buckled occupant desires to leave the vehicle, adaptive seatbelt apparatus 40 is unbuckled in the conventional fashion and the occupant leaves the vehicle. Thus further for instance, if a buckled occupant needs to rapidly leave the vehicle (e.g. the occupant is in a police emergency), or if a buckled occupant cannot reach the primary buckle eject button or is unable to depress the eject button (e.g. the occupant is in a crash such as in a water landing, the occupant's hand or arm has become disabled due to the crash, the load on the belt has caused the eject button to bind, or the operator has become panicked), and if the first situation is encountered, the load of the occupant merely attempting to leave the vehicle without touching the primary buckle eject button will cause adaptive seatbelt apparatus 40 to release with minimal effort and force or in the case of an operator releasing a child from a seatbelt, the operator merely pulls on the seatbelt. Thus further for instance, if a buckled post-crash unconscious occupant is found, an emergency responder may merely apply a simple tugging motion and load to adaptive seatbelt apparatus 40 to release adaptive seatbelt apparatus 40 (assuming the first situation). Such release method is especially helpful in a situation where the (especially conventional) seatbelt is jammed or inaccessible. It is further noted that if second buckle assembly 140 is unbuckled and a user is ready to again use adaptive seatbelt apparatus 40, second buckle assembly 140 may be re-buckled much the same as a primary seatbelt buckle is re-buckled. It is yet further noted that the invention is also particularly useful for a user such as a law enforcement officer, who vacillates between low speed patrolling with a preference for a conventional seatbelt to be unbuckled and higher speed patrolling with a preference for a seatbelt to be buckled (but possibly not being able to take the time to buckle up). Once buckled, adaptive seatbelt apparatus 40 effectively provides the benefit of both a low speed unbuckled scenario and a higher speed buckled scenario, all without ever having to touch a seatbelt buckle or button.

In summary, adaptive seatbelt apparatus 40 provides the proper amount of seatbelt restraint ability matched or adapted to a given situation. The invention functions to automatically switch back and forth from a low-load break-away seatbelt at low speed (or no speed) to a conventionally functioning seatbelt at higher speeds. Usage of adaptive seatbelt apparatus 40 is for the most part substantially "transparent" to the user. Or in other words, to the user, adaptive seatbelt apparatus 40 in practice is substantially similar to a conventional seatbelt apparatus. If the user never needs to make an emergency exit from the vehicle, the user may not even appreciate or be aware of the functioning and added safety of adaptive seatbelt apparatus 40.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seatbelt apparatus for use in allowing disengagement of said apparatus in response to a disengagement load in a first mode, and for preventing disengagement of said apparatus in response to a disengagement load in a second mode, and for automatically adjusting said apparatus from said first mode to said second mode in response to at least one predetermined input, wherein said apparatus is adapted such that in response to a first situation automatically adjusts from being disengageable in response to a disengagement load to being undisengageable in response to a disengagement load, and in response to a second situation automatically adjusts from being undisengageable in response to a disengagement load, to being disengageable in response to a disengagement load.

2. The apparatus of claim 1, wherein said first situation defines the detection of at least one of a vehicle moving at no less than a predetermined rate situation, an imminent-crash situation, and a combination thereof, and wherein said second situation defines the detection of at least one of a vehicle moving at no more than a predetermined rate situation, an imminent-crash-free situation, and a combination thereof.

3. The apparatus of claim 2, wherein said predetermined rate defines a rate of no more than at least one rate of the following group of rates comprising a 30 miles per hour rate, a 25 miles per hour rate, a 22 miles per hour rate, a 20 miles per hour rate, a 18 miles per hour rate, a 15 miles per hour rate, a 13 miles per hour rate, a 10 miles per hour rate, a 8 miles per hour rate, a 5 miles per hour rate, a 3 miles per hour rate, a 2 miles per hour rate, a 1 miles per hour rate, and a 0 miles per hour rate.

4. The apparatus of claim 1, wherein said disengagement load defines an automatically variable disengagement load that varies in response to a predetermined input.

5. The apparatus of claim 4, wherein said disengagement load defines a load in the range of 1 to 100 pounds.

6. The apparatus of claim 4, wherein said predetermined input defines the detection of at least one of an occupant of at least a predetermined size, an occupant of at least a predetermined weight, and a combination thereof.

7. The apparatus of claim 1, wherein said disengagement load defines a hands-free disengagement load.

8. A seatbelt apparatus for use in allowing disengagement of said apparatus in response to a disengagement load in a first mode, and for preventing disengagement of said apparatus in response to a disengagement load in a second mode, and for automatically adjusting said apparatus from said first mode to said second mode in response to at least one predetermined input, wherein said apparatus disengages in response to a disengagement load.

9. The apparatus of claim 8, wherein said apparatus further defines a seatbelt apparatus that in response to a first situation automatically adjusts from being disengageable in response to a disengagement load to being undisengageable in response to a disengagement load, and in response to a second situation automatically adjusts from being undisengageable in response to a disengagement load, to being disengageable in response to a disengagement load, and wherein said first situation defines the detection of at least one of a vehicle moving at no less than a predetermined rate situation, an imminent-crash situation, and a combination thereof, and wherein said second situation defines the detection of at least one of a vehicle moving at no more than a predetermined rate situation, an imminent-crash-free situation, and a combination thereof.

10. The apparatus of claim 9, wherein said predetermined rate defines a rate of no more than at least one rate of the following group of rates comprising a 30 miles per hour rate, a 25 miles per hour rate, a 22 miles per hour rate, a 20 miles per hour rate, a 18 miles per hour rate, a 15 miles per hour rate, a 13 miles per hour rate, a 10 miles per hour rate, a 8 miles per hour rate, a 5 miles per hour rate, a 3 miles per hour rate, a 2 miles per hour rate, a 1 miles per hour rate, and a 0 miles per hour rate.

11. The apparatus of claim 8, wherein said apparatus further defines a seatbelt apparatus that in response to a first situation automatically adjusts from being disengageable in response to an automatically variable disengagement load to being undisengageable in response to an automatically variable disengagement load, and in response to a second situation automatically adjusts from being undisengageable in response to an automatically variable disengagement load, to being disengageable in response to an automatically variable disengagement load.

12. The apparatus of claim 11, wherein said automatically variable disengagement load varies in response to a predetermined input, and wherein said predetermined input defines the detection of at least one of an occupant of at least a predetermined size, an occupant of at least a predetermined weight, and a combination thereof.

13. The apparatus of claim 8, wherein said disengagement load defines a hands-free disengagement load.

14. A seatbelt apparatus for use in allowing disengagement of said apparatus in response to a disengagement load in a first mode, and for preventing disengagement of said apparatus in response to a disengagement load in a second mode, and for automatically adjusting said apparatus from said first mode to said second mode in response to at least one predetermined input, wherein said apparatus disengages in response to an automatically variable disengagement load.

15. The apparatus of claim 14, wherein said apparatus further defines a seatbelt apparatus that in response to a first situation automatically adjusts from being disengageable in response to an automatically variable disengagement load to being undisengageable in response to an automatically variable disengagement load, and in response to a second situation automatically adjusts from being undisengageable in response to an automatically variable disengagement load, to being disengageable in response to an automatically variable disengagement load, and wherein said first situation defines the detection of at least one of a vehicle moving at no less than a predetermined rate situation, an imminent-crash situation, and a combination thereof, and wherein said second situation defines the detection of at least one of a vehicle moving at no more than a predetermined rate situation, an imminent-crash-free situation, and a combination thereof.

16. The apparatus of claim 15, wherein said predetermined rate defines a rate of no more than at least one rate of the following group of rates comprising a 30 miles per hour rate, a 25 miles per hour rate, a 22 miles per hour rate, a 20 miles per hour rate, a 18 miles per hour rate, a 15 miles per hour rate, a 13 miles per hour rate, a 10 miles per hour rate, a 8 miles per hour rate, a 5 miles per hour rate, a 3 miles per hour rate, a 2 miles per hour rate, a 1 miles per hour rate, and a 0 miles per hour rate.

17. The apparatus of claim 14, wherein said automatically variable disengagement load varies in response to a predetermined input, and wherein said predetermined input defines the detection of at least one of an occupant of at least a predetermined size, an occupant of at least a predetermined weight, and a combination thereof.

18. The apparatus of claim 14, wherein said disengagement load defines a hands-free disengagement load.

19. A seatbelt apparatus for use in allowing disengagement of said apparatus in response to a disengagement load in a first mode, and for preventing disengagement of said apparatus in response to a disengagement load in a second mode, and for automatically adjusting said apparatus from said first mode to said second mode in response to at least one predetermined input, wherein said apparatus automatically adjusts to become disengageable in response to a disengagement load.

20. The apparatus of claim 19, wherein said apparatus further defines a seatbelt apparatus that in response to a first situation automatically adjusts from being disengageable in response to a disengagement load to being undisengageable in response to a disengagement load, and in response to a second situation automatically adjusts from being undisengageable in response to a disengagement load, to being disengageable in response to a disengagement load, and wherein said first situation defines the detection of at least one of a vehicle moving at no less than a predetermined rate situation, an imminent-crash situation, and a combination thereof, and wherein said second situation defines the detection of at least one of a vehicle moving at no more than a predetermined rate situation, an imminent-crash-free situation, and a combination thereof.

21. The apparatus of claim 20, wherein said predetermined rate defines a rate of no more than at least one rate of the following group of rates comprising a 30 miles per hour rate, a 25 miles per hour rate, a 22 miles per hour rate, a 20 miles per hour rate, a 18 miles per hour rate, a 15 miles per hour rate, a 13 miles per hour rate, a 10 miles per hour rate, a 8 miles per hour rate, a 5 miles per hour rate, a 3 miles per hour rate, a 2 miles per hour rate, a 1 miles per hour rate, and a 0 miles per hour rate.

22. The apparatus of claim 19, wherein said apparatus further defines a seatbelt apparatus that in response to a first situation automatically adjusts from being disengageable in response to an automatically variable disengagement load to being undisengageable in response to an automatically variable disengagement load, and in response to a second situation automatically adjusts from being undisengageable in response to an automatically variable disengagement load, to being disengageable in response to an automatically variable disengagement load.

23. The apparatus of claim 22, wherein said automatically variable disengagement load varies in response to a predetermined input, and wherein said predetermined input defines the detection of at least one of an occupant of at least a predetermined size, an occupant of at least a predetermined weight, and a combination thereof.

24. The apparatus of claim 19, wherein said disengagement load defines a hands-free disengagement load.

25. A seatbelt apparatus for use in allowing disengagement of said apparatus in response to a disengagement load in a first mode, and for preventing disengagement of said apparatus in response to a disengagement load in a second mode, and for automatically adjusting said apparatus from said first mode to said second mode in response to at least one predetermined input, wherein said apparatus automatically adjusts in response to a first situation to become disengageable in response to an automatically variable disengagement load.

26. The apparatus of claim 25, wherein said apparatus further defines a seatbelt apparatus that in response to a first situation automatically adjusts from being disengageable in response to an automatically variable disengagement load to being undisengageable in response to an automatically variable disengagement load, and in response to a second situation automatically adjusts from being undisengageable in response to an automatically variable disengagement load, to being disengageable in response to an automatically variable disengagement load, and wherein said first situation defines the detection of at least one of a vehicle moving at no less than a predetermined rate situation, an imminent-crash situation, and a combination thereof, and wherein said second situation defines the detection of at least one of a vehicle moving at no more than a predetermined rate situation, an imminent-crash-free situation, and a combination thereof.

27. The apparatus of claim 26, wherein said predetermined rate defines a rate of no more than at least one rate of the following group of rates comprising a 30 miles per hour rate, a 25 miles per hour rate, a 22 miles per hour rate, a 20 miles per hour rate, a 18 miles per hour rate, a 15 miles per hour rate, a 13 miles per hour rate, a 10 miles per hour rate, a 8 miles per hour rate, a 5 miles per hour rate, a 3 miles per hour rate, a 2 miles per hour rate, a 1 miles per hour rate, and a 0 miles per hour rate.

28. The apparatus of claim 25, wherein said automatically variable disengagement load varies in response to a predetermined input, and wherein said predetermined input defines the detection of at least one of an occupant of at least a predetermined size, an occupant of at least a predetermined weight, and a combination thereof.

29. The apparatus of claim 25, wherein said disengagement load defines a hands-free disengagement load.

30. A seatbelt apparatus for use in allowing disengagement of said apparatus in response to a disengagement load in a first mode, and for preventing disengagement of said apparatus in response to a disengagement load in a second mode, and for automatically adjusting said apparatus from said first mode to said second mode in response to at least one predetermined input, wherein said apparatus releases in response to a predetermined belt tension load, wherein said load defines at least one of a less than 1 pound load, a less than 2 pounds load, a less than 3 pounds load, a less than 4 pounds load, a less than 5 pounds load, a less than 7 pounds load, a less than 10 pounds load, a less than 12 pounds load, a less than 15 pounds load, a less than 20 pounds load, a less than 25 pounds load, a less than 35 pounds load, a less than 50 pounds load, a less than 75 pounds load, a less than 100 pounds load, a less than 150 pounds load, and a less than 200 pounds load.

\* \* \* \* \*